(12) United States Patent
Samarao et al.

(10) Patent No.: US 10,921,433 B2
(45) Date of Patent: Feb. 16, 2021

(54) METHOD, APPARATUS AND SYSTEM FOR AUTOMATED VEHICLE WITH TARGET LOCALIZATION

(71) Applicant: Aptiv Technologies Limited, St. Michael (BB)

(72) Inventors: Ashwin K. Samarao, Sunnyvale, CA (US); Colin de Vrieze, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 293 days.

(21) Appl. No.: 15/877,529

(22) Filed: Jan. 23, 2018

(65) Prior Publication Data

US 2019/0212426 A1 Jul. 11, 2019

Related U.S. Application Data

(60) Provisional application No. 62/615,737, filed on Jan. 10, 2018.

(51) Int. Cl.

| | |
|---|---|
| *G01S 13/06* | (2006.01) |
| *G01S 13/931* | (2020.01) |
| *G01S 7/41* | (2006.01) |
| *G01S 5/02* | (2010.01) |
| *G01S 13/00* | (2006.01) |
| *G01S 13/32* | (2006.01) |
| *G01S 5/06* | (2006.01) |

(Continued)

(52) U.S. Cl.
CPC ............ *G01S 13/06* (2013.01); *G01S 5/0205* (2013.01); *G01S 5/0284* (2013.01); *G01S 5/06* (2013.01); *G01S 7/412* (2013.01); *G01S 13/003* (2013.01); *G01S 13/32* (2013.01); *G01S 13/878* (2013.01); *G01S 13/931* (2013.01); *G01S 2013/466* (2013.01); *G01S 2013/93274* (2020.01)

(58) Field of Classification Search
CPC ........ G01S 13/06; G01S 13/931; G01S 7/412; G01S 13/003; G01S 13/32; G01S 13/878; G01S 2013/466; G01S 2013/93274; 2013/9385; G01S 5/0205; G01S 5/0284; G01S 5/06

See application file for complete search history.

(56) References Cited

U.S. PATENT DOCUMENTS

| | | | |
|---|---|---|---|
| 2006/0114157 A1* | 6/2006 | Kolanek | G01S 3/46 342/424 |
| 2008/0291089 A1 | 11/2008 | Seong et al. | |

(Continued)

OTHER PUBLICATIONS

European Search Report for Application No. 19162608.4, European Patent Office, dated Jun. 11, 2019.

*Primary Examiner* — Timothy X Pham
(74) *Attorney, Agent, or Firm* — Colby Nipper PLLC (57) ABSTRACT

Machine-readable media, methods, apparatus and system for automated vehicle with target localization are disclosed. In some embodiments, the system may comprise at least three receivers on a first vehicle, wherein each of the at least three receivers is to receive a first signal of a first wavelength from a transmitter of a second vehicle; and a controller to calculate one or more first location candidate of the second vehicle with respect to the first vehicle, at least in part based on differences among first signal path lengths for the first signal to travel from the transmitter to each of the at least three receivers.

30 Claims, 6 Drawing Sheets

(51) Int. Cl.
*G01S 13/87* (2006.01)
*G01S 13/46* (2006.01)

(56) References Cited

U.S. PATENT DOCUMENTS

| | | |
|---|---|---|
| 2008/0316104 A1 | 12/2008 | Seong et al. |
| 2011/0285571 A1* | 11/2011 | Jeong .................... G01S 7/4026 342/27 |
| 2014/0025284 A1 | 1/2014 | Roberts |
| 2014/0111379 A1* | 4/2014 | Schelten ................... G01S 5/06 342/385 |
| 2017/0192083 A1* | 7/2017 | Avitzour ............... G01S 5/0252 |
| 2017/0248686 A1* | 8/2017 | Zivkovic ................. G01S 13/42 |
| 2018/0128917 A1* | 5/2018 | Bialer .................. G01S 13/582 |
| 2018/0292506 A1* | 10/2018 | Bjorkengren ...... G07C 9/00309 |
| 2019/0204404 A1* | 7/2019 | Razon ...................... G01S 3/74 |

* cited by examiner

METHOD, APPARATUS AND SYSTEM FOR AUTOMATED VEHICLE WITH TARGET LOCALIZATION

BACKGROUND

Radiolocation technique may be widely used to localize an object in field of autonomous driving, for example, to localize an automated vehicle by another automated vehicle. Examples of the automated vehicles may include, but not limited to, partially-automated vehicle, fully-automated vehicle, and/or others. Based on the radiolocation technique, radio waves may be transmitted by the object and a distance of the object may be measured through various ways including utilization of a difference between received signal strength as compared to originating signal strength, time of arrival at a receiving station when time of transmission and speed of propagation are known, and/or others. Examples of the radio waves may include, but not limited to, frequency modulation continuous waves (FMCW) such as sawtooth frequency modulated signal waves, chirping frequency modulated signal waves, staircase frequency modulated signals, and/or the like.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present application are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present application may be implemented in hardware, firmware, software, or any combination thereof. Embodiments of the present application implemented in a computer system may include one or more bus-based interconnects between components and/or one or more point-to-point interconnects between components. Embodiments of the present application may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the present application. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
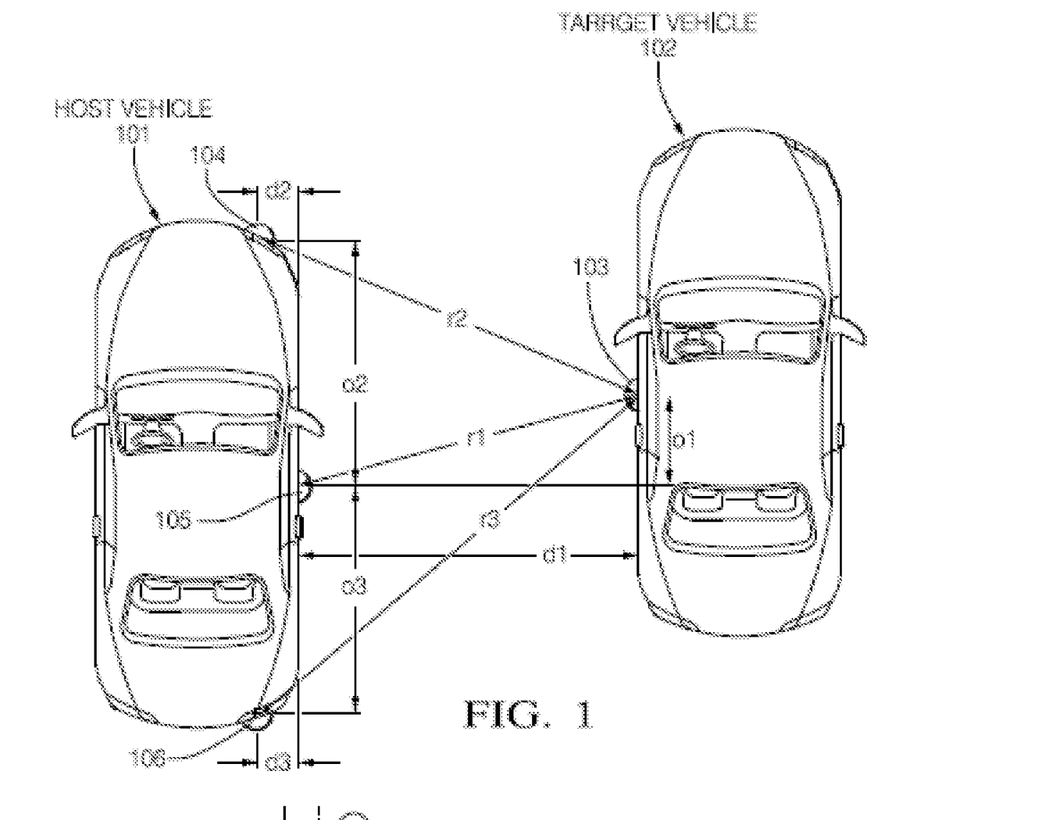
FIG. 1 schematically illustrates an example scheme having a host vehicle to determine a location of a target vehicle, in accordance with various embodiments.

FIG. 1 schematically illustrates an example scheme having a host vehicle 101 to determine a location of a target vehicle 102, in accordance with various embodiments. Examples of host vehicle 101 may comprise, but not limited to, partially-automated vehicle, fully-automated vehicle, non-automated vehicle and/or others. Examples of target vehicle 102 may comprise, but not limited to, partially-automated vehicle, fully-automated vehicle, non-automated vehicle, and/or others. In some embodiments, the term "automated vehicle" may apply to instances when host vehicle 101 and/or target vehicle 102 is being operated in an automated-mode, i.e. a fully autonomous mode, where a human-operator (not shown) of host vehicle 101 and/or target vehicle 102 may do little more than designate a destination to operate host vehicle 101 and/or target vehicle 102. However, full automation is not a requirement. It is contemplated that the teachings presented herein are useful when the host vehicle 101 and/or target vehicle 102 is operated in a partially autonomous mode, where the vehicle is capable of driving by itself under certain conditions, but the driver still needs to supervise or be called upon as a fallback. Alternatively, host vehicle 101 and/or target vehicle 102 may operate in a manual-mode, where the degree or level of automation may be little more than providing an audible or visual warning to the human-operator who is generally in control of the steering, accelerator, and brakes of host vehicle 101 and/or target vehicle 102.

Target vehicle 102 may further comprise a transmitter 103 to transmit a signal to host vehicle 101. Example of the signal may comprise, but not limited to, frequency modulated signals such as chirping frequency modulated signal, saw-tooth frequency modulated signal, and/or others. Host vehicle 101 may comprise a number of receivers, such as front receiver 104, middle receiver 105 and rear receiver 106. In some embodiments, receivers 104-106 may be implemented as radar receivers equipped with single or multiple antennas, and may receive the signal synchronously.

In some embodiments, transmitter 103 of target vehicle 102 may transmit a signal with wavelength $\lambda_1$ and received by the three receivers 104-106 with a phase difference ($d_{pf}$) between signals received from front receiver 104 and middle receiver 105 and a phase difference ($d_{pr}$) between signals received from middle receiver 105 and rear receiver 105. Examples of the transmitted and received signals may comprise, but not limited to, frequency modulated signals, such as chirping frequency modulated signals, sawtooth frequency modulated signals, staircase frequency modulated signals, and/or others.

Figure 2:
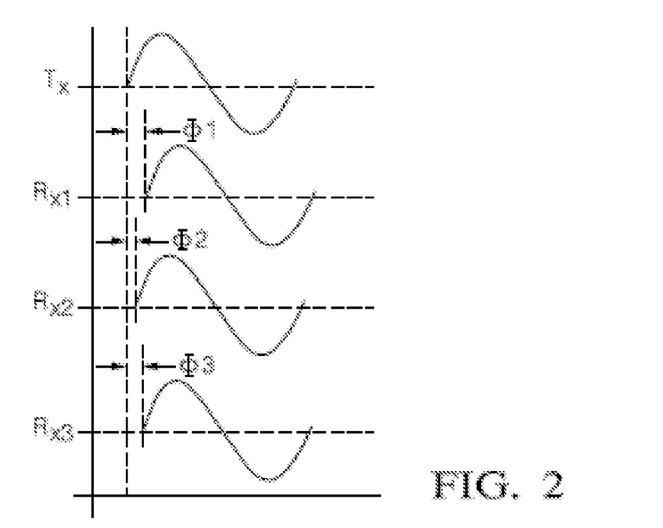
FIG. 2 schematically illustrates signal waves transmitted by a transmitter of the target vehicle and signal waves received by multiple radar receivers of the host vehicle in FIG. 1, in accordance with various embodiments.

Embodiments of the transmitted signal waves and received signal waves are illustrated in FIG. 2. As shown in FIG. 2, lateral coordinates may represent signal phase degree x and longitudinal coordinates may represent signal density function sin(x). $\phi_1$ may represent phase delay of the signal received at receiver 104, $\phi_2$ may represent phase delay of the signal received at receiver 105, and $\phi_3$ may represent a phase delay of the signal received at receiver 106. In light of this, the phase difference ($d_{pf}$) between signals received from front receiver 104 and middle receiver 105 may be obtained from a subtraction result of ($\phi_1-\phi_2$) and the phase difference ($d_{pr}$) between signals received from middle receiver 105 and rear receiver 106 may be obtained from a subtraction result of ($\phi_2-\phi_3$).

In some embodiments, at least in part based on the phase differences $d_{pf}$ and $d_{pr}$, signal path difference $d_f$ between the signal path ($r_2$) from transmitter 103 to receiver 104 and the signal path ($r_1$) from transmitter 103 to receiver 105, and signal path difference $d_r$ between the signal path ($r_2$) from transmitter 103 to receiver 105 and the signal path ($r_3$) from transmitter 103 to receiver 106 may be obtained, for example, based on the following equations:

$$d_f = \frac{d_{pf}}{2\pi}\lambda_1 \text{ and } d_r = \frac{d_{pr}}{2\pi}\lambda_1 \qquad (1)$$

In some embodiments, at least in part based on the signal path differences $d_f$ and $d_r$, a known location of receiver 104 relative to receiver 105 (e.g., longitudinal offset $o_2$ and lateral offset $d_2$) and a known location of receiver 106 relative to receiver 105 (e.g, longitudinal offset $o_3$ and lateral offset $d_3$), the location of transmitter 103 relative to receiver 105 (e.g., longitudinal offset $o_1$ and lateral offset $d_1$) may be obtained from the following equations:

$$(d_1+d_2)^2+(o_2-o_1)^2=(r_1+d_f)^2$$

$$(d_1)^2+(o_1)^2=(r_1)^2$$

$$(d_1+d_3)^2+(o_3+o_1)^2=(r_1-d_r)^2 \qquad (2)$$

Based on equations (2), assuming that longitudinal offset between front and middle receivers 104 and 105 ($o_2$) is the same as that between middle and rear receivers 105 and 106 ($o_3$), the location of transmitter 103 relative to receiver 105 (e.g., longitudinal offset $o_1$ and lateral offset $d_1$) may be obtained:

$$r_1 = \frac{2o_2^2 - (d_f^2 + d_r^2)}{2(d_f - d_r)} \qquad (3)$$

$$o_1 = \frac{1}{2o_2}r_1(d_f + d_r) + \frac{1}{4o_2}(d_f^2 - d_r^2)$$

-continued $$d_1 = \sqrt{r_1^2 - o^2}$$

In some embodiments, signal phase differences $d_{pf}$ and $d_{pr}$ may be unique within one angular circle $2\pi$. However, because of the geometric arrangements of receivers 104-106 and maximum detectable distance of transmitter 103 of target vehicle 102, there may be several phase difference candidates across multiple angular circle $n2\pi$. In other words, the signal phase differences, $d_{pf}$ and $d_{pr}$, may not be unique, which may be calculated based on the following equations:

$$d_f = \frac{d_{pf} \pm n_f 2\pi}{2\pi} \lambda_1 \quad (4)$$
$$d_r = \frac{d_{pr} \pm n_r 2\pi}{2\pi} \lambda_1$$

wherein, $n_f$ represents any integers in a range of $-n_{f\_max} < n_f < n_{f\_max}$, while $n_{f\_max} = \max d_f/\lambda_1$, $n_r$ represents any integers in a range of $-n_{r\_max} < n_r < n_{r\_max}$ while $n_{r\_max} = \max d_r/\lambda_1$. In other words, the signal path differences $d_f$ and $d_r$ may be calculated with every combination of $n_f$ and $n_r$.

Figure 3:
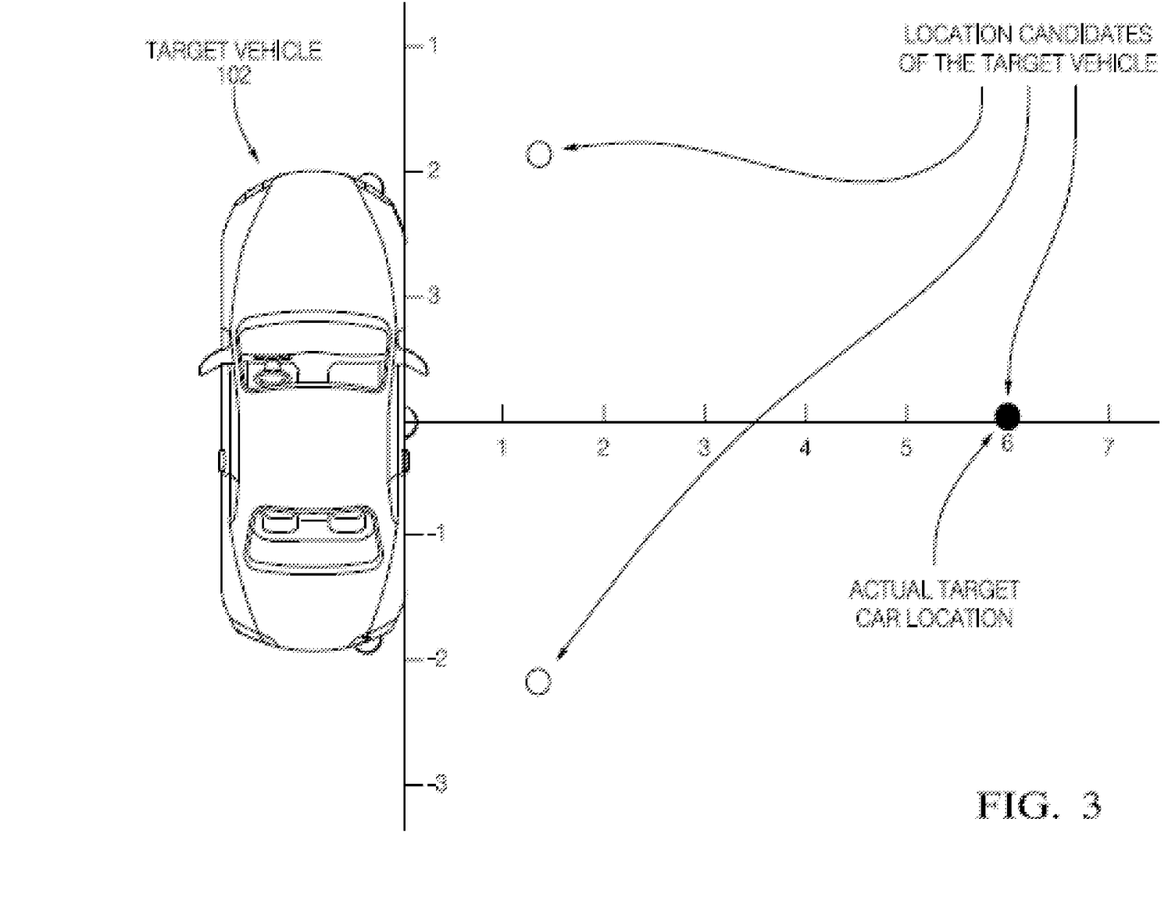
FIG. 3 schematically illustrates a situation that the location of the target vehicle is uncertain, e.g., there may be multiple location candidates of the target vehicle, in accordance with various embodiments.

The multiple candidates of the phase differences ($d_f$, $d_r$) may cause multiple location candidates of target vehicle 102, examples of which may be illustrated in FIG. 3. As shown, the location ambiguity may lead to more than one possible locations (location candidates) of target vehicle 102, such as those shown in circles in FIG. 3, one of which may represent an actual location of target vehicle 102. In order to determine the actual location, in some embodiments, transmitter 103 may transmit a second signal with wavelength $\lambda_2$, which for example, may be different from the first wavelength $\lambda_1$. At least in part based on the above-stated equations 1-4 by substituting the first signal wavelength with the second signal wavelength, multiple location candidates for target vehicle 102 may be obtained. Comparing the location candidates under the first signal wavelength and those under the second signal wavelength, one location candidate may be found that matches with a first location candidate group (i.e., the location candidates under the first signal wavelength) as well as a second location candidate group (i.e., the location candidates under the second signal wavelength), which may be determined as the actual location of target vehicle 102.

It should be understood that other technologies may implement other embodiments for example scheme as illustrated in FIG. 1. For example, although FIG. 1 illustrates that three receivers may be space-apart mounted on host vehicle 101, it should be understood that any number more than three receivers may be applicable.

Figure 4:
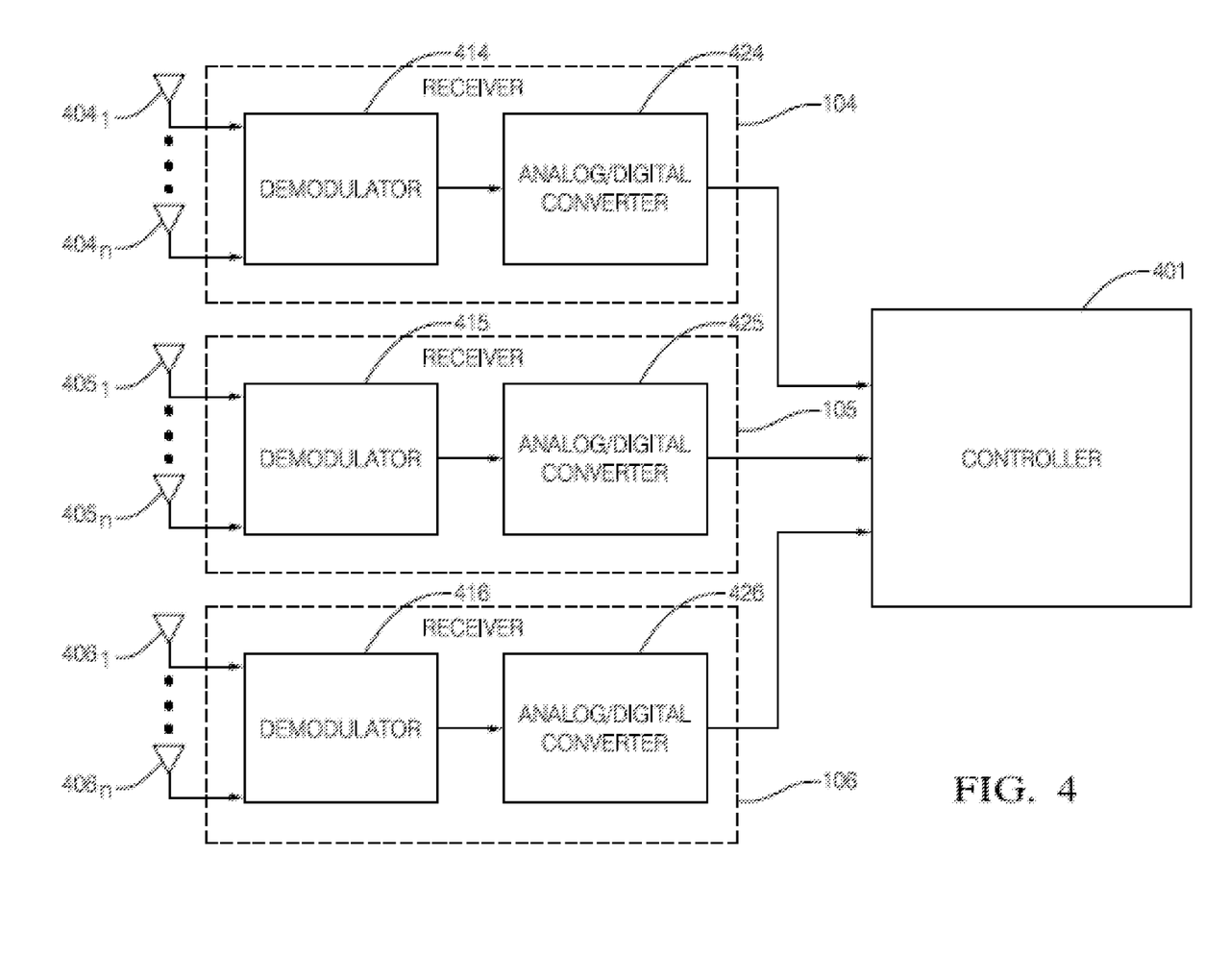
FIG. 4 schematically illustrates a radar system of the host vehicle, in accordance with various embodiments.

FIG. 4 schematically illustrates a radar system 400 of host vehicle 101, in accordance with various embodiments. As illustrated, radar system 400 may comprise multiple radar receivers (e.g., receivers 104-106 as shown in FIG. 1), a controller 401 and/or others. Each of receivers 104-106 may comprise, but not limited to, one or more antennas (e.g., antennas $404_1$-$404_n$ of receiver 104, antennas $405_1$-$405_n$ of receiver 105, and antennas $406_1$-$406_n$ of receiver 106), demodulator (e.g., demodulator 414 of receiver 104, demodulator 415 of receiver 105, and demodulator 416 of receiver 106), analog/digital converter (A/D converter) (e.g., A/D converter 424 of receiver 104, A/D converter 415 of receiver 105, A/D converter 416 of receiver 106), and/or others.

The one or more antenna (e.g., antenna $405_1$) may receive the signal transmitted from transmitter 103. Example of the signal may comprise, but not limited to, frequency modulated signals such as chirping frequency modulated signal, saw-tooth frequency modulated signal, staircase frequency modulated signals, and/or others. In some embodiments, the signal may be frequency modulated into various frequency ranges, such as, E-Band (71-76 Ghz/81-86 Ghz), dedicated short-range communications (DSRC) (5.9 GHz), "5G" (28/39 GHz) and/or others.

Demodulator (e.g., 415) may demodulate the received signal from the above-stated radio frequency signal into baseband signal. Various measures may be applied to the demodulation at the radar receiver, such as, non-linear demodulation for larger displacement or higher frequency systems and linear demodulation for smaller displacement or lower frequency systems. A/D converter (e.g., 425) may convert the analog received signal into the digital received signal. A/D converter (e.g., 425) may be chosen to match bandwidth and required signal-to-noise ratio of the signal to be quantized.

Controller 401 may determine location of target vehicle 102 through calculation at least in part based on the received signals from the multiple receivers (e.g., 104-106), as described in the above with reference to FIGS. 1-3. Controller 401 may a processor such as a microprocessor or other control circuitry such as analog and/or digital control circuitry including an application specific integrated circuit (ASIC) for processing data as should be evident to those in the art. Controller 401 may include memory (not shown), i.e. non-transitory computer-readable storage medium, including non-volatile memory, such as electrically erasable programmable read-only memory (EEPROM) for storing one or more routines, thresholds, and captured data. The memory may be part of the processor, or part of controller 401, or separate from controller 401 such as remote memory stored in cloud.

Figure 5:
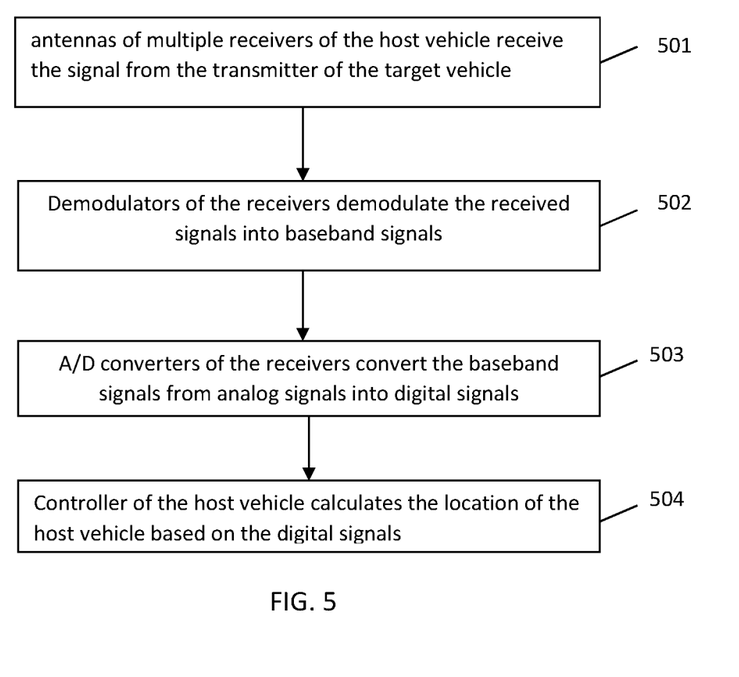
FIG. 5 schematically illustrates a method of localizing the target vehicle through utilizing various devices of the radar system of the host vehicle, in accordance with various embodiments.

FIG. 5 schematically illustrates a method of localizing target vehicle 102 through utilizing various devices of radar system 400 of host vehicle 101, in accordance with various embodiments. As illustrated, in block 501, antennas of multiple receivers (e.g., $404_1$ of receiver 104, $405_1$ of receiver 105, $406_1$ of receiver 106) or other devices of host vehicle 101 may receive the signal from transmitter 103 of target vehicle 102. Examples of the signal may comprise, but not limited to, frequency modulated signals such as chirping frequency modulated signal, saw-tooth frequency modulated signal, staircase frequency modulated signals, and/or others. The signal may be frequency modulated into various frequency ranges, for example, E-Band (71-76 Ghz/81-86 Ghz), dedicated short-range communications (DSRC) (5.9 GHz), "5G" (28/39 GHz) and/or others.

In block 502, demodulators of the receivers (e.g., demodulators 414-416) or other devices may demodulate the signals received by the multiple receivers from the above-stated radio frequency signals into baseband signals. Various measures may be applied to the demodulation at the radar receiver, such as, non-linear demodulation for larger displacement or higher frequency systems and linear demodulation for smaller displacement or lower frequency systems. In block 503, A/D converters of the receivers (e.g., A/D converters 424-426) or other devices may convert the received signals from analog signals into digital signals. The A/D converter may be chosen to match bandwidth and required signal-to-noise ratio of the signal to be quantized.

In block 504, controller 401 of radar system 400 or other devices may determine location of target vehicle 102 through calculation at least in part based on the received signals from the multiple receivers.

Figure 6:
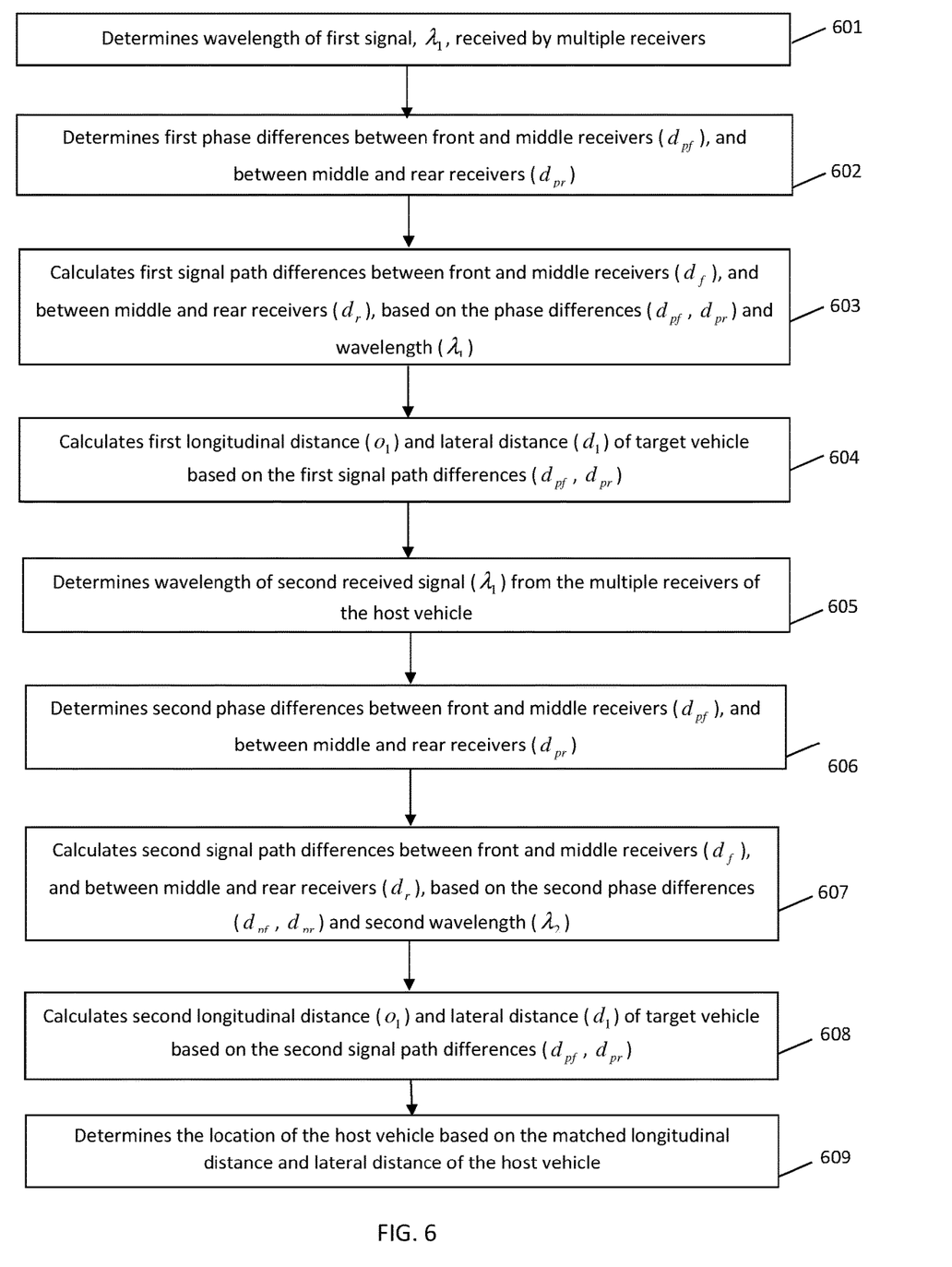
FIG. 6 schematically illustrates a method of calculating the location of the target vehicle by a controller of the radar system of the host vehicle, in accordance with various embodiments.

FIG. 6 schematically illustrates a method of calculating the location of target vehicle 102 by controller 401 of host vehicle 101, in accordance with various embodiments.

In block 601, controller 401 may determine wavelength ($\lambda_1$) of the first signal transmitted from transmitter 103 of target vehicle 102 and received by multiple receivers 104-106 of host vehicle 101. In block 602, controller 401 may calculate the first phase difference ($d_{pf}$) between the first signals respectively received at receiver 104 and receiver 105 through subtracting the first received signal phase delays (e.g., $\phi_1 - \phi_2$), and calculate the first phase difference ($d_{pr}$) between the first signals respectively received at receiver 105 and receiver 106 through subtracting the first received signal phase delays (e.g., $\phi_2 - \phi_3$).

In block 603, at least in part based on the first phase differences $d_{pf}$ and $d_{pr}$, first signal path difference $d_f$ for the first signal to travel from transmitter 103 to receiver 104 (signal path ($r_2$)) and from transmitter 103 to receiver 105 (signal path ($r_1$)), and first signal path difference $d_r$ for the first signal to travel from transmitter 103 to radar receiver 106 (signal path ($r_2$)) and from transmitter 103 to radar receiver 106 (signal path ($r_3$)) may be obtained, for example, based on the following equations:

$$d_f = \frac{d_{pf}}{2\pi}\lambda_1 \text{ and } d_r = \frac{d_{pr}}{2\pi}\lambda_1 \qquad (1)$$

In block 604, at least in part based on the first signal path differences $d_f$ and $d_r$, the known location of receiver 104 relative to receiver 105 (i.e., longitudinal offset $o_2$ and lateral offset $d_2$) and the known location of receiver 106 relative to receiver 105 (i.e., longitudinal offset $o_3$ and lateral offset $d_3$), the location of transmitter 103 relative to receiver 105 (i.e., longitudinal offset $o_1$ and lateral offset $d_1$) may be obtained, for example, based on the following equations:

$$(d_1+d_2)^2+(o_2-o_1)^2=(r_1+d_f)^2$$

$$(d_1)^2+(o_1)^2=(r_1)^2$$

$$(d_1+d_3)^2+(o_3+o_1)^2=(r_1-d_r)^2 \qquad (2)$$

Based on equations (2), assuming that longitudinal offset between front and middle receivers 104 and 105 ($o_2$) is the same as that between middle and rear receivers 105 and 106 ($o_3$), the location of transmitter 103 relative to receiver 105 (e.g., longitudinal offset $o_1$ and lateral offset $d_1$) may be obtained:

$$r_1 = \frac{2o_2^2 - (d_f^2 + d_r^2)}{2(d_f - d_r)} \qquad (3)$$

$$o_1 = \frac{1}{2o_2}r_1(d_f + d_r) + \frac{1}{4o_2}(d_f^2 - d_r^2)$$

$$d_1 = \sqrt{r_1^2 - o^2}$$

In some embodiments, the first signal phase differences $d_{pf}$ and $d_{pr}$ may be unique within one angular circle $2\pi$. However, because of the geometric arrangements of receivers 104-106 and maximum detectable distance of transmitter 103 of target vehicle 102, there may be several phase differences candidates across multiple angular circle $n2\pi$. In other words, the signal phase differences, $d_{pf}$ and $d_{pr}$, may not be unique, which may be calculated based on the following equations:

$$d_f = \frac{d_{pf} \pm n_f 2\pi}{2\pi}\lambda_1 \qquad (4)$$

$$d_r = \frac{d_{pr} \pm n_r 2\pi}{2\pi}\lambda_1$$

Wherein, $n_f$ represents integers in a range of $-n_f\_max < n_f < n_f\_max$, while $n_f\_max = \max d_f/\lambda_1$, $n_r$ represents integers in a range of $-n_r\_max < n_r < n_r\_max$ while $n_r\_max = \max d_r/\lambda_1$. In other words, the signal path differences $d_f$ and $d_r$ may be calculated with every combination of $n_f$ and $n_r$.

The multiple candidates of the phase differences ($d_f$, $d_r$) may cause multiple location candidates of target vehicle 102, examples of which may be illustrated in FIG. 3. As shown, the location ambiguity may lead to more than one possible locations (location candidates) of target vehicle 102, such as those shown in circles in FIG. 3, one of which may represent an actual location of target vehicle 102. In order to determine the actual location, in some embodiments, transmitter 103 may transmit a second signal with wavelength $\lambda_2$, which for example may be different from the first wavelength $\lambda_1$, in block 605. At least in part based on the above-stated equations 1-4 by substituting the first signal wavelength $\lambda_1$ with the second signal wavelength $\lambda_2$, multiple location candidates for target vehicle 102 may be obtained, in blocks 606-608.

More specifically, in block 606, second phase differences between receivers 104 and 105 ($d_{pf}$) and between receivers 105 and 106 ($d_{pr}$) may be determined. In block 607, at least in part based on the second phase differences ($d_{pf}$ and $d_{pr}$) and second signal wavelength ($\lambda_2$), second signal path differences between receivers 104 and 105 ($d_f$) and between receivers 105 and 106 ($d_r$) may be determined. In block 608, at least in part based on the second signal path differences ($d_f$ and $d_r$), location candidates of transmitter 103 of target vehicle 102 relative to receiver 105 of host vehicle 101, namely, candidates of second longitudinal distance ($o_1$) and second lateral distance ($d_1$) of transmitter 103 may be determined.

In block 609, comparing the location candidates under the first signal wavelength and those under the second signal wavelength, one location candidate may be found that matches with a first location candidate group (i.e., the location candidates under the first signal wavelength) as well as a second location candidate group (i.e., the location candidates under the second signal wavelength), which may be determined as the actual location of target vehicle.

Figure 7:
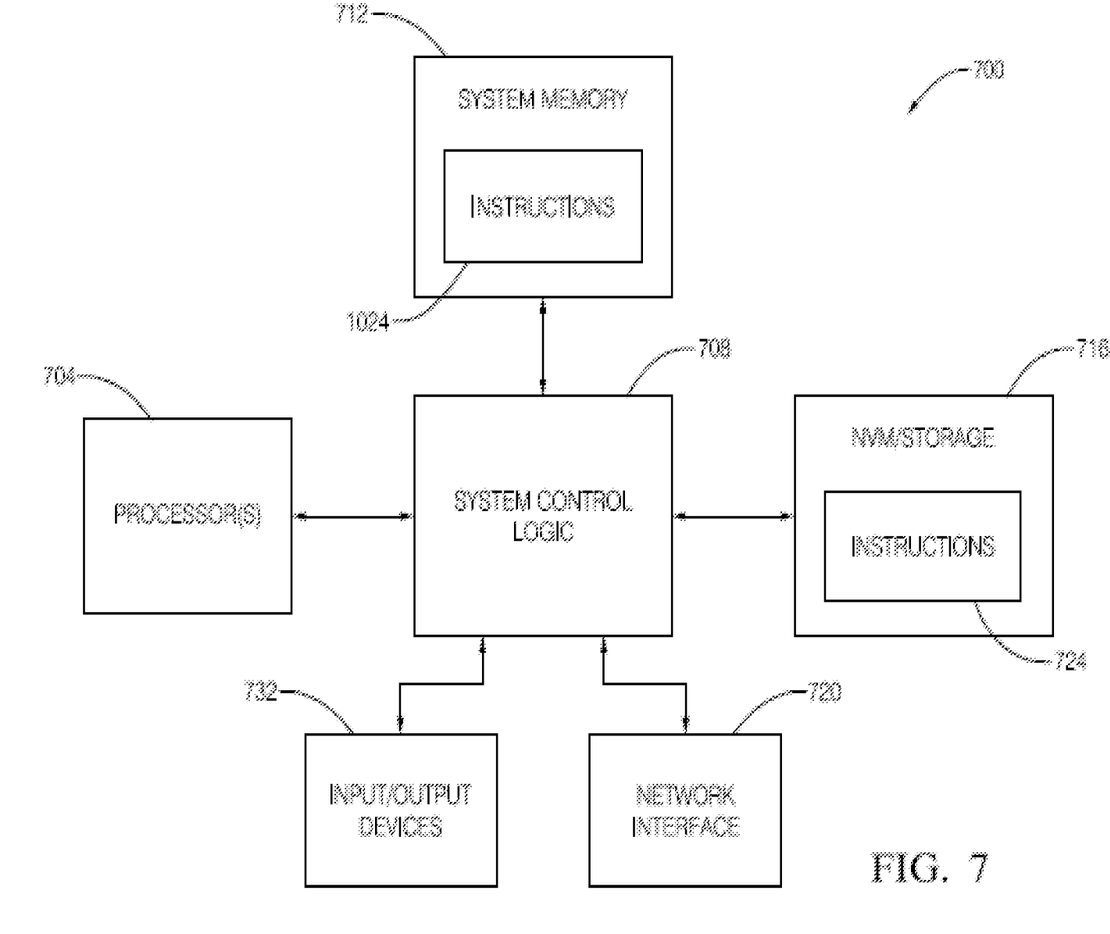
FIG. 7 schematically illustrates an example computing system of the host vehicle, in accordance with various embodiments.

FIG. 7 schematically illustrates an example system in accordance with various embodiments. In some embodiments, the system 700 may comprise one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, an input/output device (I/O) 732 coupled with system control logic 708, and/or others.

Processor(s) 704 may include one or more single-core or multi-core processors. Processor(s) 704 may include any combination of general-purpose processors and dedicated processors (e.g., graphics processors, application processors, baseband processors, etc.). In an embodiment in which system 700 implements multiple functionalities including, but not limited to, those of controller 401, processors(s) 704 may be configured to execute one or more embodiment(s) as illustrated in FIGS. 4-6. In other embodiment, the functionalities of controller 401 may be embedded in the I/O device 732 of the system 700, in which case the I/O device 732 may be configured to execute one or more embodiment(s) as illustrated in FIGS. 4-6.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720.

System memory 712 and NVM/storage 716 may respectively include, in particular, temporal and persistent copies of instructions 724. In various embodiments, instructions 724, or hardware, firmware, and/or software components thereof, may additionally/alternatively be located in the system control logic 708, the network interface 720, and/or the processor(s) 704.

Network interface 720 may provide a radio interface for system 700 to communicate over one or more network(s) and/or with any other suitable device. In various embodiments, the network interface 720 may be integrated with other components of system 700. For example, the network interface may include a processor of the processor(s) 704, memory of the system memory 712, NVM/Storage of NVM/Storage 716, and/or a firmware device (not being illustrated) having instructions executable by at least one of the processor(s) 704.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

The system 700 may further include input/output (I/O) devices 732. The I/O devices 732 may include user interfaces designed to enable user interaction with the system 700, peripheral component interfaces designed to enable peripheral component interaction with the system 700, and/or sensors designed to determine environmental conditions and/or location information related to the system 700. The I/O devices 732 for one embodiment may further include any suitable hardware and/or firmware, such as a plurality of antennas (e.g., antennas $404_1$-$404_n$, $405_1$-$405_n$, and/or $406_1$-$406_n$), demodulators (e.g., 414-416), A/D converter (e.g., 424-426), and/or others to provide radio interface. In other embodiments, the I/O device 732 may be integrated with other components of system 700. For example, the I/O device 732 may include a processor of the processor(s) 704, memory of the system memory 712, NVM/Storage of NVM/ Storage 716, and/or a firmware device (not being illustrated) having instructions executable by at least one of the processor(s) 704 to execute instructions as illustrated in FIGS. 5-6 to calculate the location of target vehicle 102.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

The disclosure may include various example embodiments disclosed below.

Example 1 includes a system of a first vehicle comprising: at least three receivers, wherein each of the at least three receivers is to receive a first signal of a first wavelength from a transmitter of a second vehicle; and a controller to calculate one or more first location candidate of the second vehicle with respect to the first vehicle, at least in part based on differences among first signal path lengths for the first signal to propagate from the transmitter to each of the at least three receivers.

Example 2 includes the system of example 1, wherein the at least three receivers are further to receive a second signal of a second wavelength from the transmitter of the second vehicle, wherein the first wavelength is different from the second wavelength; and the controller is further to calculate one or more second location candidate of the second vehicle with respect to the first vehicle, at least in part based on differences among second signal path lengths for the second signal to propagate from the transmitter to each of the at least three receivers.

Example 3 includes the system of example 1 or 2, wherein the controller is further to determine a location of the second vehicle with respect to the first vehicle, as least in part based on a location candidate included in the one or more first location candidate as well as in the one or more second location candidate.

Example 4 includes the system of any of examples 1-3, wherein the at least three receivers comprise a front receiver, a middle receiver, and a rear receiver that are space-apart mounted on the first vehicle.

Example 5 includes the system of any of examples 1-4, wherein the plurality of first location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

Wherein, $r_m$ represents distance between the transmitter and the middle receiver, r represents vertical offset of the front receiver relative to the middle receiver, $d_f$ represents the difference of the first signal path lengths for the first signal to propagate from the transmitter to the front receiver and from the transmitter to the rear receiver, $d_r$ represents the difference of the first signal path lengths for the first signal to propagate from the transmitter to the rear receiver and from the transmitter to the middle receiver, o represents vertical distance between the transmitter and the middle receiver, d represents horizontal distance between the transmitter and the middle receiver Example 6 includes the system of any of examples 1-5, wherein the $d_f$ and $d_r$ are calculated respectively based on the following equations:

$$d_f = \frac{d_{pf} \pm n_f 2\pi}{2\pi}\lambda_1$$

$$d_r = \frac{d_{pr} \pm n_r 2\pi}{2\pi}\lambda_1$$

Wherein, $d_{pf}$ represents a difference of signal phases between the first signal received by the front receiver and the first signal received by the radar receiver, $d_{pr}$ represents a difference of signal phases between the first signal received by the rear receiver and the first signal received by the middle receiver, $n_f$ represents any integers in a range of $-n_{f\_}max < n_f < n_{f\_}max$ while $n_{f\_}max = max\ d_f/\lambda_1$, $n_r$ represents any integers in a range of $-n_{r\_}max < n_r < n_{r\_}max$ while $n_{r\_}max = max\ d_r/\lambda_1$, $\lambda_1$ represents the first wavelength of the first signal. In other words, the signal path differences $d_f$ and $d_r$ may be calculated with every combination of $n_f$ and $n_r$.

Example 7 includes the system of any of examples 1-6, wherein max $d_f$ or max $d_r$ depends on a maximum detectable distance of the second vehicle and geometry arrangements of the front receiver and the middle receiver.

Example 8 includes the system of any of examples 1-7, wherein the one or more second location candidate is calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

Wherein, $r_m$ represents distance between the transmitter and the middle receiver, r represents vertical offset of the front receiver relative to the middle receiver, $d_f$ represents the difference of the second signal path lengths for the second signal to propagate from the transmitter to the front receiver and from the transmitter to the rear receiver, $d_r$ represents the difference of the second signal path lengths for the second signal to propagate from the transmitter to the rear receiver and from the transmitter to the middle receiver, o represents vertical distance between the transmitter and the middle receiver, d represents horizontal distance between the transmitter and the middle receiver.

Example 9 includes the system of any of examples 1-8, wherein the $d_f$ and $d_r$ are calculated respectively based on the following equations:

$$d_f = \frac{d_{pf} \pm n_f 2\pi}{2\pi}\lambda_2$$

$$d_r = \frac{d_{pr} \pm n_r 2\pi}{2\pi}\lambda_2$$

Wherein, $d_{pf}$ represents a difference of signal phases between the first signal received by the front receiver and the first signal received by the middle receiver, $d_{pr}$ represents a difference of signal phases between the first signal received by the rear receiver and the first signal received by the middle receiver, $n_f$ represents any integers in a range of $-n_{f\_}max < n_f < n_{f\_}max$, while $n_{f\_}max = max\ d_f/\lambda_2$, $n_r$ represents any integers in a range of $-n_{r\_}max < n_r < n_{r\_}max$, while $n_{r\_}max = max\ d_r/\lambda_2$, $\lambda_2$ represents the second wavelength of the second signal. In other words, the signal path differences $d_f$ and $d_r$ may be calculated with every combination of $n_f$ and $n_r$.

Example 10 includes the system of any of examples 1-9, wherein the first vehicle and/or the second vehicle are automated vehicle or non-automated vehicle.

Example 11 includes a method comprising: receiving, by at least three receivers of a first vehicle, a first signal of a first wavelength from a transmitter of a second vehicle; and calculating, by a controller of the first vehicle, one or more first location candidate of the second vehicle with respect to the first vehicle, at least in part based on differences among first signal path lengths for the signal to propagate from the transmitter to each of the at least three receivers.

Example 12 includes the method of example 11, further comprising: receiving, by the at least three receivers, a second signal of a second wavelength from the transmitter of the second vehicle, wherein the first wavelength is different from the second wavelength; and calculating, by the controller, one or more second location candidate of the second vehicle with respect to the first vehicle, at least in part based on differences among second signal path lengths for the second signal to propagate from the transmitter to each of the at least three receivers.

Example 13 includes the method of example 11 or 12, further comprising: determining, by the controller, a location of the second vehicle with respect to the first vehicle, as least in part based on a location candidate matching with the one or more first location candidate as well as with the one or more second location candidate.

Example 14 includes the method of any of examples 11-13, wherein the at least three receivers comprise a front receiver, a middle receiver, and a rear receiver that are space-apart mounted on the first vehicle.

Example 15 includes the method of any of examples 11-14, wherein the plurality of first location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

Wherein, $r_m$ represents distance between the transmitter and the middle receiver, r represents vertical offset of the front receiver relative to the middle receiver, $d_f$ represents the difference of the first signal path lengths for the first signal to propagate from the transmitter to the front receiver and from the transmitter to the rear receiver, $d_r$ represents the difference of the first signal path lengths for the first signal to propagate from the transmitter to the rear receiver and from the transmitter to the middle receiver, o represents vertical distance between the transmitter and the middle receiver, d represents horizontal distance between the transmitter and the middle receiver.

Example 16 includes the method of any of examples 11-15, wherein the $d_f$ and $d_r$ are calculated respectively based on the following equations:

$$d_f = \frac{d_{pf} \pm n_f 2\pi}{2\pi}\lambda_1$$

$$d_r = \frac{d_{pr} \pm n_r 2\pi}{2\pi}\lambda_1$$

Wherein, $d_{pf}$ represents a difference of signal phases between the first signal received by the front receiver and the first signal received by the radar receiver, $d_{pr}$ represents a difference of signal phases between the first signal received by the rear receiver and the first signal received by the middle receiver, $n_f$ represents any integers in a range of $-n_f\_max < n_f < n_f\_max$ while $n_f\_max = max\ d_f/\lambda_1$, $n_r$ represents any integers in a range of $-n_r\_max < n_r < n_r\_max$ while $n_r\_max = max\ d_r/\lambda_1$, $\lambda_1$ represents the first wavelength of the first signal. In other words, the signal path differences $d_f$ and $d_r$ may be calculated with every combination of $n_f$ and $n_r$.

Example 17 includes the method of any of examples 11-16, wherein max $d_f$ or max $d_r$ depends on a maximum detectable distance of the second vehicle and geometry arrangements of the front receiver and the middle receiver.

Example 18 includes the method of any of examples 11-17, wherein the one or more second location candidate is calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

Wherein, $r_m$ represents distance between the transmitter and the middle receiver, r represents vertical offset of the front receiver relative to the middle receiver, $d_f$ represents the difference of the second signal path lengths for the second signal to propagate from the transmitter to the front receiver and from the transmitter to the rear receiver, $d_r$ represents the difference of the second signal path lengths for the second signal to propagate from the transmitter to the rear receiver and from the transmitter to the middle receiver, o represents vertical distance between the transmitter and the middle receiver, d represents horizontal distance between the transmitter and the middle receiver.

Example 19 includes the method of any of examples 11-18, wherein the $d_f$ and $d_r$ are calculated respectively based on the following equations:

$$d_f = \frac{d_{pf} \pm n_f 2\pi}{2\pi}\lambda_2$$

$$d_r = \frac{d_{pr} \pm n_r 2\pi}{2\pi}\lambda_2$$

Wherein, $d_{pf}$ represents a difference of signal phases between the first signal received by the front receiver and the first signal received by the middle receiver, $d_{pr}$ represents a difference of signal phases between the first signal received by the rear receiver and the first signal received by the middle receiver, $n_f$ represents any integers in a range of $-n_f\_max < n_f < n_f\_max$, while $n_f\_max = max\ d_f/\lambda_2$, $n_r$ represents any integers in a range of $-n_r\_max < n_r < n_r\_max$, while $n_r\_max = max\ d_r/\lambda_2$, $\lambda_2$ represents the second wavelength of the second signal. In other words, the signal path differences $d_f$ and $d_r$ may be calculated with every combination of $n_f$ and $n_r$.

Example 20 includes the method of any of examples 11-19, wherein the first vehicle and/or the second vehicle are automated vehicle or non-automated vehicle.

Example 21 includes one or more machine-readable storage media comprising a plurality of instructions stored thereon that, in response to being executed cause a system to execute any of the operations discussed above in any combinations.

Additionally, in an example, the reference range may include a maximum allowable range between the first mobile communication device and the second mobile communication device. In an example, the reference range may include an initial range between the first mobile communication device and the second mobile communication device prior to capturing the begin movement. In an example, the begin movement may include a shaking movement in which the first mobile communication device and the second mobile communication are each shaken twice. In an example, the end movement may include a shaking movement in which the first mobile communication device and the second mobile communication are each shaken three times.

The invention claimed is:

1. A system of a first vehicle, comprising:
   at least three receivers, wherein each of the at least three receivers is configured to receive a first signal of a first wavelength from a transmitter of a second vehicle; and
   a controller configured to:
      calculate one or more first location candidates of the second vehicle with respect to the first vehicle, the one or more first location candidates calculated based on differences among first signal phases for the first signal received at each of the at least three receivers, a lateral distance between each of the at least three receivers, a longitudinal distance between each of the at least three receivers, and the first wavelength, the one or more first location candidates including a longitudinal distance between the transmitter and one of the at least three receivers and a lateral distance between the transmitter and the one of the at least three receivers; and provide the one or more first location candidates as an input of a relative position of the second vehicle with respect to the first vehicle to support a partially-automated or a fully-automated operation of the first vehicle.

2. The system of claim 1, wherein:

the at least three receivers are further configured to receive a second signal of a second wavelength from the transmitter of the second vehicle, wherein the first wavelength is different from the second wavelength; and the controller is further configured to calculate one or more second location candidates of the second vehicle with respect to the first vehicle, the one or more second location candidates calculated based on differences among second signal phase delays for the second signal received at each of the at least three receivers, the lateral distance between each of the at least three receivers, the longitudinal distance between each of the at least three receivers, and the second wavelength, the one or more second location candidates including a longitudinal distance between the transmitter and one of the at least three receivers and a lateral distance between the transmitter and the one of the at least three receivers.

3. The system of claim 2, wherein, the controller is further configured to:

determine the first wavelength of the first signal and the second wavelength of the second signal;

determine a location of the second vehicle with respect to the first vehicle, which matches with one of the one or more first location candidates as well as one of the one or more second location candidates; and provide the location of the second vehicle with respect to the first vehicle to support the partially-automated or the fully-automated operation of the first vehicle.

4. The system of claim 1, wherein the at least three receivers comprise a front receiver, a middle receiver, and a rear receiver that are space-apart mounted on the first vehicle.

5. The system of claim 4, wherein the one or more first location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of first signal path lengths for the first signal to travel from the transmitter to the front receiver and from the transmitter to the rear receiver, $d_r$ represents a difference of the first signal path lengths for the first signal to travel from the transmitter to the rear receiver and from the transmitter to the middle receiver, o represents a vertical distance between the transmitter and the middle receiver, and d represents a horizontal distance between the transmitter and the middle receiver.

6. The system of claim 5, wherein the $d_f$ and $d_r$ are calculated respectively based on the following equations:

$$d_f = \frac{d_{pf} \pm n_f 2\pi}{2\pi}\lambda_1$$

$$d_r = \frac{d_{pr} \pm n_r 2\pi}{2\pi}\lambda_1$$

wherein, $d_{pf}$ represents a difference of signal phases between the first signal received by the front receiver and the first signal received by the radar receiver, $d_{pr}$ represents a difference of signal phases between the first signal received by the rear receiver and the first signal received by the middle receiver, and $n_f$ represents any integers in a range of $-n_{f\_}max < n_f < n_{f\_}max$ while $n_{f\_}max = max d_f/\lambda_1$, $n_r$ represents any integers in a range of $-n_{r\_}max < n_r < n_{r\_}max$ while $n_{r\_}max = max d_r/\lambda_1$, $\lambda_1$ represents the first wavelength of the first signal.

7. The system of claim 6, wherein max $d_f$ or max $d_r$ depends on a maximum detectable distance of the second vehicle and geometry arrangements of the front receiver and the middle receiver.

8. The system of claim 4, wherein the one or more second location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of second signal path lengths for the second signal to travel from the transmitter to the front receiver and from the transmitter to the rear receiver, $d_r$ represents a difference of second signal path lengths for the second signal to travel from the transmitter to the rear receiver and from the transmitter to the middle receiver, o represents a vertical distance between the transmitter and the middle receiver, d represents a horizontal distance between the transmitter and the middle receiver.

9. The system of claim 8, wherein the $d_f$ and $d_r$ are calculated respectively based on the following equations:

$$d_f = \frac{d_{pf} \pm n_f 2\pi}{2\pi}\lambda_2$$

$$d_r = \frac{d_{pr} \pm n_r 2\pi}{2\pi}\lambda_2$$

wherein, $d_{pf}$ represents a difference of signal phases between the first signal received by the front receiver and the first signal received by the middle receiver, $d_{pr}$ represents a difference of signal phases between the first signal received by the rear receiver and the first signal received by the middle receiver, $n_f$ represents any integers in a range of $-n_{f\_}\max < n_f < n_{f\_}\max$ while $n_{f\_}\max = \max d_f/\lambda_2, \lambda_2$ represents any integers in a range of $-n_{r\_}\max < n_r < n_{r\_}\max$ while $n_{r\_}\max = \max d_r/\lambda_2, \lambda_2$ represents the second wavelength of the second signal.

10. The system of claim 1, wherein:
the at least three receivers are radar receivers; and
at least one of the first vehicle or the second vehicle are an automated vehicle.

11. A method, comprising:
receiving, by at least three receivers of a first vehicle, a first signal of a first wavelength from a transmitter of a second vehicle;
calculating, by a controller of the first vehicle, one or more first location candidates of the second vehicle with respect to the first vehicle, the one or more first location candidates calculated based on differences among first signal phases for the first signal received at each of the at least three receivers, a lateral distance between each of the at least three receivers, a longitudinal distance between each of the at least three receivers, and the first wavelength, the one or more first location candidates including a longitudinal distance between the transmitter and one of the at least three receivers and a lateral distance between the transmitter and the one of the at least three receivers; and
providing the one or more first location candidates as an input of a relative position of the second vehicle with respect to the first vehicle to support a partially-automated or a fully-automated operation of the first vehicle.

12. The method of claim 11, further comprising:
receiving, by the at least three receivers, a second signal of a second wavelength from the transmitter of the second vehicle, wherein the first wavelength is different from the second wavelength; and
calculating, by the controller, one or more second location candidates of the second vehicle with respect to the first vehicle, the one or more second location candidates calculated at least in part based on differences among second signal phase delays for the second signal received at each of the at least three receivers, the lateral distance between each of the at least three receivers, the longitudinal distance between each of the at least three receivers, and the second wavelength, the one or more second location candidates including a longitudinal distance between the transmitter and one of the at least three receivers and a lateral distance between the transmitter and the one of the at least three receivers.

13. The method of claim 12, further comprising:
determining, by the controller, the first wavelength of the first signal and the second wavelength of the second signal;
determining a location of the second vehicle with respect to the first vehicle, which matches with one of the one or more first location candidates as well as one of the one or more second location candidates; and
providing the location of the second vehicle with respect to the first vehicle to support the partially-automated or the fully-automated operation of the first vehicle.

14. The method of claim 11, wherein the at least three receivers comprise a front receiver, a middle receiver, and a rear receiver that are space-apart mounted on the first vehicle.

15. The method of claim 14, wherein the one or more first location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of first signal path lengths for the first signal to travel from the transmitter to the front receiver and from the transmitter to the rear receiver, $d_r$ represents a difference of the first signal path lengths for the first signal to travel from the transmitter to the rear receiver and from the transmitter to the middle receiver, o represents a vertical distance between the transmitter and the middle receiver, and d represents a horizontal distance between the transmitter and the middle receiver.

16. The method of claim 15, wherein the $d_f$ and $d_r$ are calculated respectively based on the following equations:

$$d_f = \frac{d_{pf} \pm n_f 2\pi}{2\pi}\lambda_1$$

$$d_r = \frac{d_{pr} \pm n_r 2\pi}{2\pi}\lambda_1$$

wherein, $d_{pf}$ represents a difference of signal phases between the first signal received by the front receiver and the first signal received by the radar receiver, $d_{pr}$ represents a difference of signal phases between the first signal received by the rear receiver and the first signal received by the middle receiver, and $n_f$ represents any integers in a range of $-n_{f\_}\max < n_f < n_{f\_}\max$ while $n_{f\_}\max = \max d_f/\lambda_1$, $n_r$ represents any integers in a range of $-n_{r\_}\max < n_r < n_{r\_}\max$ while $n_{r\_}\max = \max d_r/\lambda_1$, $\lambda_1$ represents the first wavelength of the first signal.

17. The method of claim 16, wherein max $d_f$ or max $d_r$ depends on a maximum detectable distance of the second vehicle and geometry arrangements of the front receiver and the middle receiver.

18. The method of claim 14, wherein the one or more second location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of second signal path lengths for the second signal to travel from the transmitter to the front receiver and from the transmitter to the rear receiver, $d_r$ represents a difference of second signal path lengths for the second signal to travel from the transmitter to the rear receiver and from the transmitter to the middle receiver, o represents a vertical distance between the transmitter and the middle receiver, d represents a horizontal distance between the transmitter and the middle receiver.

19. The method of claim 18, wherein the $d_f$ and $d_r$ are calculated respectively based on the following equations:

$$d_f = \frac{d_{pf} \pm n_f 2\pi}{2\pi}\lambda_2$$

$$d_r = \frac{d_{pr} \pm n_r 2\pi}{2\pi}\lambda_2$$

wherein, $d_{pf}$ represents a difference of signal phases between the first signal received by the front receiver and the first signal received by the middle receiver, $d_{pr}$ represents a difference of signal phases between the first signal received by the rear receiver and the first signal received by the middle receiver, $n_f$ represents any integers in a range of $-n_{f\_}max < n_f < n_{f\_}max$ while $n_{f\_}max = max d_f/\lambda_2, \lambda_2$ represents any integers in a range of $-n_{r\_}max < n_r < n_{r\_}max$ while $n_{r\_}max = max\ d_r/\lambda_2, \lambda_2$ represents the second wavelength of the second signal.

20. The method of claim 11, wherein:
the at least three receivers are radar receivers; and
at least one of the first vehicle or the second vehicle are an automated vehicle.

21. One or more non-transitory machine-readable storage media comprising a plurality of instructions stored thereon that, in response to being executed cause a system to:
calculate one or more first location candidates of a first vehicle with respect to a second vehicle, the one or more first location candidates calculated based on differences among first signal phases for a first signal received at each of at least three receivers, a lateral distance between each of the at least three receivers, a longitudinal distance between each of the at least three receivers, and a first wavelength, the one or more first location candidates including a longitudinal distance between a transmitter and one of at least three receivers and a lateral distance between the transmitter and the one of the at least three receivers;
calculate one or more second location candidates of the first vehicle with respect to the second vehicle, the one or more second location candidates calculated based on differences among second signal phase delays for a second signal received at each of the at least three receivers, the lateral distance between each of the at least three receivers, the longitudinal distance between each of the at least three receivers, and a second wavelength, wherein a first wavelength of the first signal is different from a second wavelength of a second signal, the one or more second location candidates including a longitudinal distance between the transmitter and one of the at least three receivers and a lateral distance between the transmitter and the one of the at least three receivers; and
provide the one or more first location candidates and the one or more second location candidates as an input of a relative position of the second vehicle with respect to the first vehicle to support a partially-automated or a fully-automated operation of the first vehicle.

22. The one or more non-transitory machine-readable storage media of claim 21, further comprising instructions stored thereon that, in response to being executed cause the system to:
determine the first wavelength of the first signal and the second wavelength of the second signal;
determine a location of the second vehicle with respect to the first vehicle, which matches with one of the one or more first location candidates as well as one of the one or more second location candidates; and
provide the location of the second vehicle with respect to the first vehicle to support the partially-automated or the fully-automated operation of the first vehicle.

23. The one or more non-transitory machine-readable storage media of claim 21, wherein the at least three receivers comprise a front receiver, a middle receiver, and a rear receiver that are space-apart mounted on the first vehicle.

24. The one or more non-transitory machine-readable storage media of claim 23, wherein the one or more first location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of first signal path lengths for the first signal to travel from the transmitter to the front receiver and from the transmitter to the rear receiver, $d_r$ represents a difference of the first signal path lengths for the first signal to travel from the transmitter to the rear receiver and from the transmitter to the middle receiver, o represents a vertical distance between the transmitter and the middle receiver, and d represents a horizontal distance between the transmitter and the middle receiver.

25. The one or more non-transitory machine-readable storage media of claim 24, wherein the $d_f$ and $d_r$ are calculated respectively based on the following equations:

$$d_f = \frac{d_{pf} \pm n_f 2\pi}{2\pi}\lambda_1$$

$$d_r = \frac{d_{pr} \pm n_r 2\pi}{2\pi}\lambda_1$$

wherein, $d_{pf}$ represents a difference of signal phases between the first signal received by the front receiver and the first signal received by the radar receiver, $d_{pr}$ represents a difference of signal phases between the first signal received by the rear receiver and the first signal received by the middle receiver, and $n_f$ represents any integers in a range of $-n_{f\_}max < n_f < n_{f\_}max$ while $n_{f\_}max = max d_f/\lambda_1$, $n_r$ represents any integers in a range of $-n_{r\_}max < n_r < n_{r\_}max$ while $n_{r\_}max = max\ d_r/\lambda_1$, $\lambda_1$ represents the first wavelength of the first signal.

26. The one or more non-transitory machine-readable storage media of claim 25, wherein max $d_f$ or max $d_r$ depends on a maximum detectable distance of the second vehicle and geometry arrangements of the front receiver and the middle receiver.

27. The one or more non-transitory machine-readable storage media of claim 23, wherein the one or more second location candidates are calculated based on the following equations:

$$r_m = \frac{2r^2 - (d_f^2 + d_r^2)}{2(d_f - d_r)}$$

$$o = \frac{1}{2r}r_m(d_f + d_r) + \frac{1}{4r}(d_f^2 - d_r^2)$$

$$d = \sqrt{r_m^2 - o^2}$$

wherein, $r_m$ represents a distance between the transmitter and the middle receiver, r represents a vertical offset of the front receiver relative to the middle receiver, $d_f$ represents a difference of second signal path lengths for the second signal to travel from the transmitter to the front receiver and from the transmitter to the rear receiver, $d_r$ represents a difference of second signal path lengths for the second signal to travel from the transmitter to the rear receiver and from the transmitter to the middle receiver, o represents a vertical distance between the transmitter and the middle receiver, d represents a horizontal distance between the transmitter and the middle receiver.

28. The one or more non-transitory machine-readable storage media of claim 27, wherein the $d_f$ and $d_r$ are calculated respectively based on the following equations:

$$d_f = \frac{d_{pf} \pm n_f 2\pi}{2\pi}\lambda_2$$

$$d_r = \frac{d_{pr} \pm n_r 2\pi}{2\pi}\lambda_2$$

wherein, $d_{pf}$ represents a difference of signal phases between the first signal received by the front receiver and the first signal received by the middle receiver, $d_{pr}$ represents a difference of signal phases between the first signal received by the rear receiver and the first signal received by the middle receiver, $n_f$ represents any integers in a range of $-n_f\_max < n_f < n_f\_max$ while $n_f\_max = max d_f/\lambda_2$, $\lambda_2$ represents any integers in a range of $-n_r\_max < n_r < n_r\_max$ while $n_r\_max = max d_r/\lambda_2$, $\lambda_2$ represents the second wavelength of the second signal.

29. The one or more non-transitory machine-readable storage media of claim 28, wherein max $d_f$ or max $d_r$ depends on a maximum detectable distance of the second vehicle and geometry arrangements of the front receiver and the middle receiver.

30. The one or more non-transitory machine-readable storage media of claim 21, wherein:
   the at least three receivers are radar receivers; and
   at least one of the first vehicle or the second vehicle are an automated vehicle.

* * * * *